United States Patent
Callahan

(10) Patent No.: US 11,149,634 B2
(45) Date of Patent: *Oct. 19, 2021

(54) TURBINE POWERED ELECTRICITY GENERATION

(71) Applicant: Richard Alan Callahan, Isle La Motte, VT (US)

(72) Inventor: Richard Alan Callahan, Isle La Motte, VT (US)

(*) Notice: Subject to any disclaimer, the term of this patent is extended or adjusted under 35 U.S.C. 154(b) by 0 days.

This patent is subject to a terminal disclaimer.

(21) Appl. No.: 16/290,001

(22) Filed: Mar. 1, 2019

(65) Prior Publication Data

US 2020/0277895 A1    Sep. 3, 2020

(51) Int. Cl.
| | | |
|---|---|---|
| F02C 6/18 | (2006.01) | |
| F02C 3/22 | (2006.01) | |
| F02C 3/28 | (2006.01) | |
| F01K 23/10 | (2006.01) | |

(52) U.S. Cl.
CPC ............. *F02C 3/28* (2013.01); *F01K 23/10* (2013.01); *F02C 3/22* (2013.01); *F02C 6/18* (2013.01)

(58) Field of Classification Search
CPC ...... F02C 6/18; F02C 3/22; F02C 3/28; F01K 23/10; F01K 23/14
See application file for complete search history.

(56) References Cited

U.S. PATENT DOCUMENTS

| | | |
|---|---|---|
| 2,548,377 A | 4/1951 | Kapitza |
| 4,083,945 A | 4/1978 | Fenton et al. |
| 4,085,199 A | 4/1978 | Singleton et al. |
| 4,094,746 A | 6/1978 | Masciantonio et al. |
| 4,345,925 A | 8/1982 | Cheung |
| 4,382,366 A | 5/1983 | Gaumer |
| 4,531,371 A | 7/1985 | Voronin et al. |
| 4,533,375 A | 8/1985 | Erickson |
| 4,732,597 A * | 3/1988 | Jujasz .............. F25J 3/0409 62/652 |
| 4,836,833 A * | 6/1989 | Nicholas .............. C01B 3/56 95/55 |
| 4,946,477 A * | 8/1990 | Perka .............. C07C 29/1518 48/197 R |
| 5,666,800 A * | 9/1997 | Sorensen .............. F25J 3/04545 60/781 |
| 5,700,438 A | 12/1997 | Miller |

(Continued)

FOREIGN PATENT DOCUMENTS

| | | |
|---|---|---|
| CN | 1713949 A | 12/2005 |
| CN | 102946981 A | 2/2013 |

(Continued)

OTHER PUBLICATIONS

IGCC With Low Temperature Membrane (LTM) Carbon Capture, Dislosure to Air Products, Oct. 24, 2006, by Enerfex, Inc.

(Continued)

*Primary Examiner* — William H Rodriguez

(74) *Attorney, Agent, or Firm* — Steven H. Markowitz

(57) ABSTRACT

A process is provided for separating syngas fuel into a CO-rich stream for feeding to oxyfuel combustor means of $CO_2$ turbine means and a $H_2$-rich stream for feeding to air-fuel gas turbine means for generating power provides opportunity to realize operating and equipment advantages.

12 Claims, 2 Drawing Sheets

(56) References Cited

U.S. PATENT DOCUMENTS

| | | | |
|---|---|---|---|
| 6,389,814 B2 | 5/2002 | Viteri et al. | |
| 6,976,362 B2 * | 12/2005 | Sheppard | F25J 3/04539 60/780 |
| 6,997,971 B1 | 2/2006 | Young et al. | |
| 7,827,794 B1 | 11/2010 | Pronske et al. | |
| 7,863,341 B2 * | 1/2011 | Routier | C01B 3/38 518/702 |
| 7,909,898 B2 | 3/2011 | White et al. | |
| 7,950,529 B2 | 5/2011 | Kulkarni et al. | |
| 8,420,211 B2 | 4/2013 | Ohya et al. | |
| 8,541,517 B2 | 9/2013 | Klaehn et al. | |
| 8,596,075 B2 | 12/2013 | Allam et al. | |
| 8,715,379 B2 | 5/2014 | Briesch et al. | |
| 8,753,426 B2 | 6/2014 | Zheng et al. | |
| 8,959,887 B2 | 2/2015 | Allam et al. | |
| 9,062,608 B2 | 6/2015 | Allam et al. | |
| 9,321,015 B2 | 4/2016 | Jayaweera et al. | |
| 9,776,863 B2 | 10/2017 | Iaquaniello et al. | |
| 9,782,718 B1 | 10/2017 | Baker et al. | |
| 9,812,723 B2 | 11/2017 | Ghezel-Ayagh | |
| 9,869,245 B2 | 1/2018 | Allam et al. | |
| 9,932,229 B2 | 4/2018 | Iaquaniello et al. | |
| 10,047,671 B2 | 8/2018 | Allam et al. | |
| 10,144,874 B2 | 12/2018 | Walter et al. | |
| 2008/0112867 A1 * | 5/2008 | Wei | B01J 19/2485 423/224 |
| 2010/0287986 A1 * | 11/2010 | Jibb | F25J 3/04315 62/640 |
| 2011/0232292 A1 * | 9/2011 | Rabovitser | F02C 1/00 60/772 |
| 2012/0144837 A1 * | 6/2012 | Rasmussen | F25J 3/04569 60/772 |
| 2012/0195824 A1 | 8/2012 | Van De Graaf et al. | |
| 2013/0098603 A1 * | 4/2013 | Kerr | E21B 43/2408 166/245 |
| 2014/0251897 A1 | 9/2014 | Livingston et al. | |
| 2015/0276309 A1 * | 10/2015 | Beasse | B01D 19/0031 62/617 |
| 2015/0308676 A1 * | 10/2015 | Lee | B01J 12/007 431/121 |
| 2016/0375410 A1 | 12/2016 | Berchtold et al. | |
| 2017/0081477 A1 | 3/2017 | Mcgrath et al. | |
| 2018/0304193 A1 | 10/2018 | Al-Maythalony et al. | |
| 2020/0276535 A1 * | 9/2020 | Callahan | F02C 3/20 |

FOREIGN PATENT DOCUMENTS

| | | |
|---|---|---|
| CN | 205779064 U | 12/2016 |
| DE | 3855952 T2 | 2/1998 |
| JP | 01194925 A | 8/1989 |
| JP | 200109859 | 4/2000 |
| JP | 2003106164 A | 4/2003 |
| JP | 200754270 A | 10/2007 |
| JP | 5242207 B2 | 7/2013 |
| JP | 2016522836 A | 8/2016 |
| WO | WO-2007092084 A2 * | 8/2007 ........ C10J 3/00 |
| WO | WO2012045335 A1 | 4/2012 |
| WO | WO2018043053 A1 | 3/2018 |

OTHER PUBLICATIONS

Clarke Energy Syngas Newsletter, https ://www .clark-energy .com/ synthesis-gas-syngas.

E-Combustion Capture, CATF (Clean Air Task Force) article, 2019.

Giovanni Lozza et al., "C02 Capture from Natural Gas Combined Cycles", Article from ResearchGate, Jan. 2009.

Ube C02 Separation Membranehttp, product bulletin obtained from ://www.ube.co.th/picture/file/C02%20Separation%20Membrane.pdf.

Sonal Patel Game-Changing Supercritical CO2 Cycles Are Closer to Commercialization, Dec. 13, 2017, Connected Plant Conference https://www.powermag.com/a.

Syngas Composition https://www.netl.doe.gov/research/coal/energy-systems/gasification/gasifipedia/syngas-composition.

Ube Technical Bulletin, UBE Gas Separation System, by Polyimide Membrane, 1989.

Xijia Lu et al., Investigation of Low Rank Coal Gasification in a Two-Stage Downdraft Entrained-Flow Gasifier, International Journal of Clean Coal and Energy, 2014.

Richard Dennis, Overview of Supercritical Carbon Dioxide Based Power Cycles for Stationary Power Generation.

F. Ksuya et al. High purity CO gas separation by pressure swing adsorption.

Analysis and Optimization of ASU for Oxyfuel Combustion Sichuan Air Separation Plant.

J.M. Aman et al., Reforming Natural Gas for CO 2pre-combustion capture in Combined Cycle power plant.

A. Zogala, Equilibrium Simulations of Coal Gasification—Factors Affecting Syngas Composition, Journal of Sustainable Mining, 2014 eISSN 2300 3960/ p-ISSN2300-1364.

Air Products CRIEPI Test Facility, Figure 7.5 from Robert E. Kesting and A.K. Fritzsche, Polymeric Gas Separation Membranes, John Wiley & Sons, Inc. (Dec. 1993).

Clark Energy News Letter https://www.clark-energy.com/synthesis-gas-syngas.

David Wegman This Power Plant runs on CO2 https://spectrum.ieee.org/energy/fossil-fuels/this-power-plant-runs-on-c02.

eCombustion Capture, CATF article 2019.

Giovanni Lozza et al., CO2 Capture from Natural Gas Combined Cycles, Article from ResearchGate, Jan. 2009.

Indira S. Jayaweera, Development of Pre-Combustion CQ2 Capture Process Using High-Temperature Polybenzimidazole (PBI) Hollow-Fiber Membranes (HFMs).

S. Wong, Co2 capture: Pre-combustion and oxy-fuel technologies, Original test: S.Wong APEC Capacity Building in the APEC Region, Phase II revised and updated by CO2CRC.

* cited by examiner

TURBINE POWERED ELECTRICITY GENERATION

FIELD OF THE INVENTION

The present invention relates to turbine-powered electricity supply.

BACKGROUND OF THE INVENTION

All patents, patent applications and other publications referred to herein are specifically incorporated herein by reference in their entirety.

Synthesis gas (syngas) is a gas mixture comprising primarily hydrogen ($H_2$), carbon monoxide (CO), water ($H_2O$) and carbon dioxide ($CO_2$), with minor amounts of other compounds (e.g., nitrogen, argon, hydrogen sulfide and methane). It can be produced by a number of known methods, including but not limited to coal gasification, steam methane reforming (SMR) and autothermal reforming (ATR).

In coal gasification, by way of non-limiting illustration, raw coal is pulverized in a mill and dried in a hot gas furnace. The pulverized and dried coal is pressurized in a lock hopper. The pressurized coal is mixed with oxygen and steam and the mixture is fed to a gasifier reactor. In the reactor, the coal particles heat up by pyrolysis, releasing volatiles and producing char. Volatiles from the pyrolysis and char react with oxygen to produce $CO_2$ and generate heat for gasification. Char reacts with steam to produce syngas. The gasification reaction is stopped by water quenching. Scrubbing water can be used to remove residual dust and impurities from the syngas. Coal gasification can be a major source for $H_2$. In order to increase the yield of $H_2$ the syngas is subjected to the water-gas shift reaction in which CO is reacted with $H_2O$ to produce $CO_2$ and $H_2$:

$$CO + H_2O \rightleftharpoons CO_2 + H_2$$

In the steam reforming process, a mixture of water and hydrocarbon, typically natural gas, are contacted at a high temperature, for example, in the range of about 850° to about 900° C., and typically in the presence of a catalyst, to form a mixture of hydrogen and carbon monoxide. Using methane as the hydrocarbon, the theoretical stoichiometry for the steam reforming reaction is as follows:

$$CH_4 + H_2O \rightleftharpoons CO + 3H_2$$

Among uses, syngas can be used as fuel for various turbines. In a gas turbine syngas is fed as a fuel together with air. There are three main turbine components:

1. An upstream axial rotating gas compressor;
2. A downstream turbine on a common shaft with the compressor;
3. A combustion chamber or area, called a combustor, in between 1, and 2. above.

Atmospheric air flows through the compressor that brings it to higher pressure. Fuel is mixed with the air in a combustor wherein it is ignited to produce high temperature working fluid. In the case of syngas as fuel, energy is added by spraying syngas into the air and igniting it. This high-temperature high-pressure working fluid enters a turbine where it expands down to an exhaust pressure, producing shaft work output in the process. The turbine shaft work is used to drive the compressor; the energy that is not used to drive the compressor exits in the exhaust gases to produce thrust. The purpose of the gas turbine determines the design so that the most desirable split of energy between the thrust and the shaft work is achieved.

As illustrated in U.S. Pat. Nos. 9,782,718 and 3,965,675, a gas turbine can be combined with a steam turbine. In this "combined" system, hot exhaust from the gas turbine produces steam in a heat recovery steam generator for feeding as a working fluid to a steam turbine. In the combined system, each of the gas turbine and the steam turbine can be utilized to produce electricity.

Gas turbine power plants and combined gas turbine/steam turbine power plants known as combined cycle power plants (CC) can use the burning of fossil fuel to generate required heat. These systems have known drawbacks, for example harmful air emissions. Natural gas power plants produce large quantities of pollutants, especially carbon dioxide. Coal fired plants add sulfur oxides, mercury and fine particles. These drawbacks are typically addressed by adding expensive, energy-intensive equipment to reduce or clean up emissions after they are produced. However, the required systems degrade performance, reliability and increase the cost of electricity and the total cost of the power plant. They are expensive to build, complex and energy intensive.

A turbine-powered electricity generator system under development in hopes of overcoming these drawbacks is a supercritical $CO_2$ ($sCO_2$) system that uses supercritical $CO_2$ (carbon dioxide) as the working fluid for the turbine(s). Using supercritical $CO_2$ as a working fluid in turbines, the high fluid density of $sCO_2$ enables much smaller hardware packages and efficiencies above 50%. It also facilitates high pressure carbon dioxide capture into the system without an added cost penalty, while carbon capture in conventional power plants is an expensive add-on that reduces system efficiency.

These systems are touted as a zero-emissions power generation system, as there is no smokestack and no water consumption though water is produced as a product of combustion. In the $sCO_2$ system, fuel is burned with pure oxygen of at least about 95% purity (oxy-combustion) instead of ambient air. This is preferable because air is almost 80% nitrogen and creates harmful NOx pollution when combusted. Oxy-combustion virtually eliminates NOx. High purity oxygen of at least about 95% purity produced using an Air Separation Unit (ASU) is combined with fuel and high pressure $sCO_2$ in a combustor and sent through a $sCO_2$ turbine where power is produced. $sCO_2$ and steam exit the turbine and flow into a heat exchanger where the steam is condensed out as liquid water and some of the $sCO_2$ is looped back to the combustor while the remainder exits the system through a high-pressure $CO_2$ pipeline.

These systems are much smaller than conventional power plants and the small footprint translates to lower capital costs. High pressure is used throughout the system and enables higher power densities as smaller components are used.

See Dennis, Richard "Overview of Supercritical Carbon Dioxide Based Power Cycles for Stationary Power Generation". [online] Presented to: ARPA-E Workshop on High Efficiency High Temp. Modular Power Utilizing Innovative Designs, Materials, and Manufacturing Techniques Oct. 19-20, 2017 [retrieved 1-16-2019], Advanced Turbines and Supercritical $CO_2$ Power Cycles Programs US DOE Office of Fossil Energy National Energy Technology Laboratory, [online][retrieved Jan. 16, 2019][https://arpa-e.energy.gov/sites/default/files/1c%20-%20Dennis%20%28final%29.pdf]. See, also Wagman, David "This Power Plant Runs on $CO_2$," [online] IEE SPECTRUM, 30 May 2018, [retrieved Jan. 28, 2019] [https://arpa-e.energy.gov/sites/default/files/1c%20-%20Dennis%20%28final%29.pdf].

A non-limiting illustrative example of a sCO$_2$ plant is schematically described with reference to FIG. 1. Fuel gas stream 4 such as natural gas, syngas, etc., is fed to combustor 5, wherein it is combusted with high purity oxygen stream 8 of at least about 95% purity from air separation unit 6 in which air feed 7 is processed into the high purity oxygen stream 8. For natural gas as fuel gas stream 4, combustion occurs according to the reaction $$CH_4 + 2O_2 \rightarrow CO_2 + 2H_2O$$

For syngas comprising H$_2$, CO and CH$_4$ as fuel gas stream 4, combustion occurs according to the reactions $$2H_2 + O_2 \rightarrow 2H_2O$$

$$CO + \tfrac{1}{2}O_2 \rightarrow CO_2$$

$$CH_4 + 2O_2 \rightarrow CO_2 + 2H_2O$$

Stream 9 comprises high pressure and temperature super critical CO$_2$ and steam which is fed to super critical CO$_2$ turbine 10. The turbine is connected to an electricity generator 11. The turbine exhaust stream 12 comprises super critical CO$_2$ and steam. Stream 12 flows through heat exchanger 13 in indirect contact with sCO$_2$ recycle stream 34 followed by second heat exchanger 15 and then through water separator means 16 for removal of condensed water 17. 23 is a closed loop cooler which keeps the cooling medium 36 relatively cool. The sCO$_2$ working fluid leaving the water separator 16, is compressed in CO$_2$ compressor 18, and then cooled in aftercooler 19 to remove heat of compression. Compressed and cooled sCO$_2$ in stream 20 is circulated by pump 21 for capture in stream 22 and recirculation in stream 34 then forwarded through regenerative heat exchanger 13 and finally back to combustor 5.

However, sCO$_2$ based power plants have disadvantages. One major disadvantage of these plants relates to the high capital cost (primarily due to oxygen requirements) and large power requirement inherent in conventional cryogenic air separation units required to generate oxygen. For example, see Global CCS Institute S. Wong "Module 3 CO$_2$ capture: Pre-combustion (decarbonisation) and oxy-fuel technologies, *APEC Capacity Building in the APEC Region, Phase II Revised and updated by CO2CRC and ICF International.* [online][retrieved 1-12-2019] [https://hub.globalccsinstitute.com/publications/building-capacity-co2-capture-and-storage-apec-region-training-manual-policy-makers-and-practitioners/module-3-co2-capture-pre-combustion-decarbonisation-and-oxy-fuel-technologies]

The present invention relates to a process for the treatment of syngas into a CO-rich stream and a H$_2$-rich stream and the use thereof resulting in significant advantages of reduced capital investment and operating costs for a sCO$_2$ based power plant, a combined gas turbine/steam turbine or a hybrid power plant based on the combination of a sCO$_2$ power plant and a CC power plant.

According to an embodiment, the process comprises:
a. feeding a separator feedstream comprising syngas to separator means,
b. separating the separator feedstream in the separator means to form a first, CO-rich stream and a second, H$_2$-rich stream,
c. feeding the first CO-rich stream as an oxyfuel combustor feedstream to an oxyfuel combustor means wherein the oxyfuel combustor feedstream is reacted with a high purity oxygen feedstream of at least about 95% purity, and
d. feeding the second H$_2$-rich stream as an air-fuel combustor feedstream to air-fuel combustor means wherein the air-fuel combustor feedstream is reacted with air.

In the context of prior art systems that encouraged the enrichment of CO$_2$ (e.g., by the water gas shift reaction) in pre-combustion syngas for CO$_2$ capture therefrom, it was unexpectedly discovered that the separation of syngas into a CO-rich stream and a H$_2$-rich stream, wherein the CO-rich stream is fed to an oxyfuel combustor for reaction with high purity oxygen enables more efficient inherent post combustion CO$_2$ capture. Significant additional advantages are also realized therefrom as described in more detail below. By feeding the H$_2$-rich stream to air-fuel gas turbine means for generating power, additional advantages can be realized, also as discussed in more detail below.

According to another embodiment, the process comprises:
a. feeding a separator feedstream comprising syngas from a coal gasifier to membrane separator means,
b. separating the separator feedstream to form a first, CO-rich retentate stream, and a second, H$_2$-rich permeate stream,
c. feeding the retentate stream as an oxyfuel combustor feedstream to oxyfuel combustor means wherein the oxyfuel combustor feedstream is reacted with a high purity oxygen feedstream of at least about 95% purity to form a supercritical CO$_2$ working fluid,
d. feeding the supercritical CO$_2$ working fluid to supercritical CO$_2$ turbine means for producing power, wherein the supercritical CO$_2$ turbine means provides power to electricity generator means for generating electric power,
e. feeding the permeate stream as an air-fuel combustor feedstream to air-fuel combustor means wherein the air-fuel combustor feedstream is reacted with air to form an air-fuel gas turbine working fluid,
f. feeding the air-fuel gas turbine working fluid to air-fuel gas turbine means for producing power, wherein the air-fuel gas turbine means provides power to electricity generator means for generating electric power,
g. feeding air-fuel gas turbine exhaust from the air-fuel gas turbine means to heat recovery means wherein steam is formed, and
h. feeding the steam formed in step g. as working fluid to steam turbine means for producing power, wherein the steam turbine means provides power to electricity generator means for generating electric power.

According to a further embodiment, the process comprises:
a. feeding a separator feedstream comprising syngas from a steam methane reformer to membrane separator means,
b. separating the separator feedstream to form a first, CO-rich retentate stream, and a second, H$_2$-rich permeate stream,
c. feeding the retentate stream as an oxyfuel combustor feedstream to oxyfuel combustor means wherein the oxyfuel combustor feedstream is reacted with a high purity oxygen stream of at least about 95% purity to form a supercritical CO$_2$ working fluid,
d. feeding the supercritical CO$_2$ working fluid to supercritical CO$_2$ turbine means for producing power, wherein the supercritical CO$_2$ turbine means provides power to electricity generator means for generating electric power,
e. feeding the permeate stream as an air-fuel combustor feedstream to air-fuel combustor means wherein the air-fuel combustor feedstream is reacted with air to form air-fuel gas turbine working fluid, f. feeding the air-fuel gas turbine working fluid to air-fuel gas turbine means for producing power, wherein the air-fuel gas turbine means provides power to electricity generator means for generating electric power, g. feeding air-fuel gas turbine exhaust from the gas turbine means to heat recovery means wherein steam is formed, and h. feeding the steam formed in step g. as working fluid to steam turbine means for producing power, wherein the steam turbine means provides power to electricity generator means for generating electric power.

DETAILED DESCRIPTION OF THE INVENTION

Figure 1:
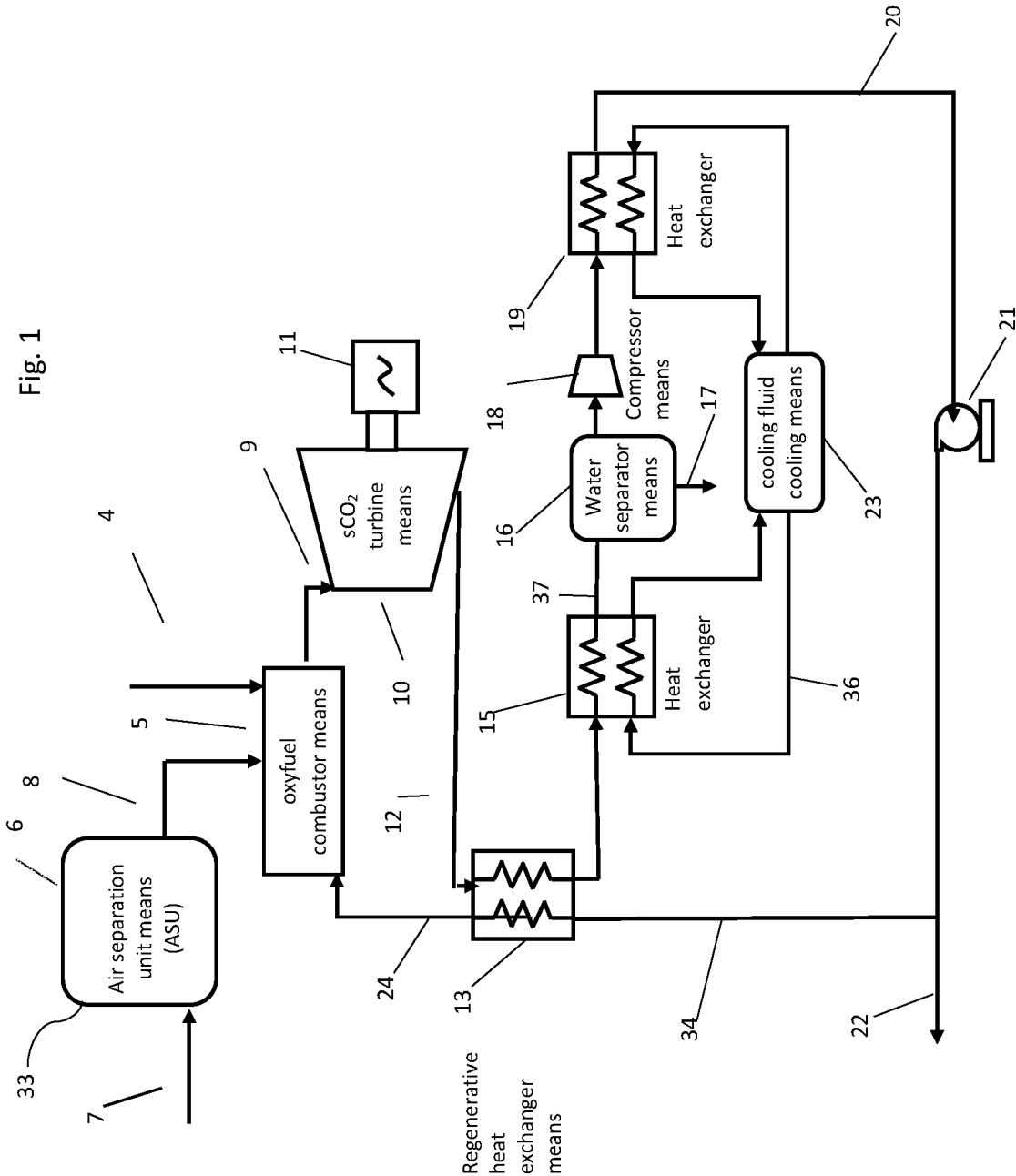
FIG. 1 is a schematic diagram of a supercritical carbon dioxide turbine plant.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein.

All publications, patents and patent applications cited herein, whether supra or infra, are hereby incorporated herein by reference in their entirety to the same extent as if each individual publication, patent or patent application was specifically and individually indicated to be incorporated herein by reference. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, as well as, any range formed within a specified range, regardless of whether ranges are separately disclosed. Where a range of numerical values is recited herein, unless otherwise stated, the range is intended to include the endpoints thereof, and all integers and fractions within the range. For example, recitation of 1-5 is intended to include all integers including and between 1 and 5 and all fractions and decimals between 1 and 5, e.g., 1, 1.1, 1.2, 1.3 etc. It is not intended that the scope of the invention be limited to the specific values recited when defining a specific range. Similarly, recitation of at least about or up to about a number is intended to include that number and all integers, fractions and decimals greater than or up to that number as indicated. For example, at least 5 is intended to include 5 and all fractions and decimals above 5, e.g., 5.1, 5.2, 5.3 etc.

It is noted that, as used in this specification and the appended claims, the singular forms "a," "an" and "the" include plural referents unless the content clearly dictates otherwise. Unless otherwise expressly indicated herein, all amounts are based on volume.

According to an embodiment, the process comprises:

a. feeding a separator feedstream comprising syngas to separator means, b. separating the separator feedstream in the separator means to form a first, CO-rich stream and a second, $H_2$-rich stream, c. feeding the first CO-rich stream as an oxyfuel combustor feedstream to an oxyfuel combustor means wherein the oxyfuel combustor feedstream is reacted with a high purity oxygen feedstream of at least about 95% purity, and d. feeding the second $H_2$-rich stream as an air-fuel combustor feedstream to air-fuel combustor means wherein the air-fuel combustor feedstream is reacted with air.

Figure 2:
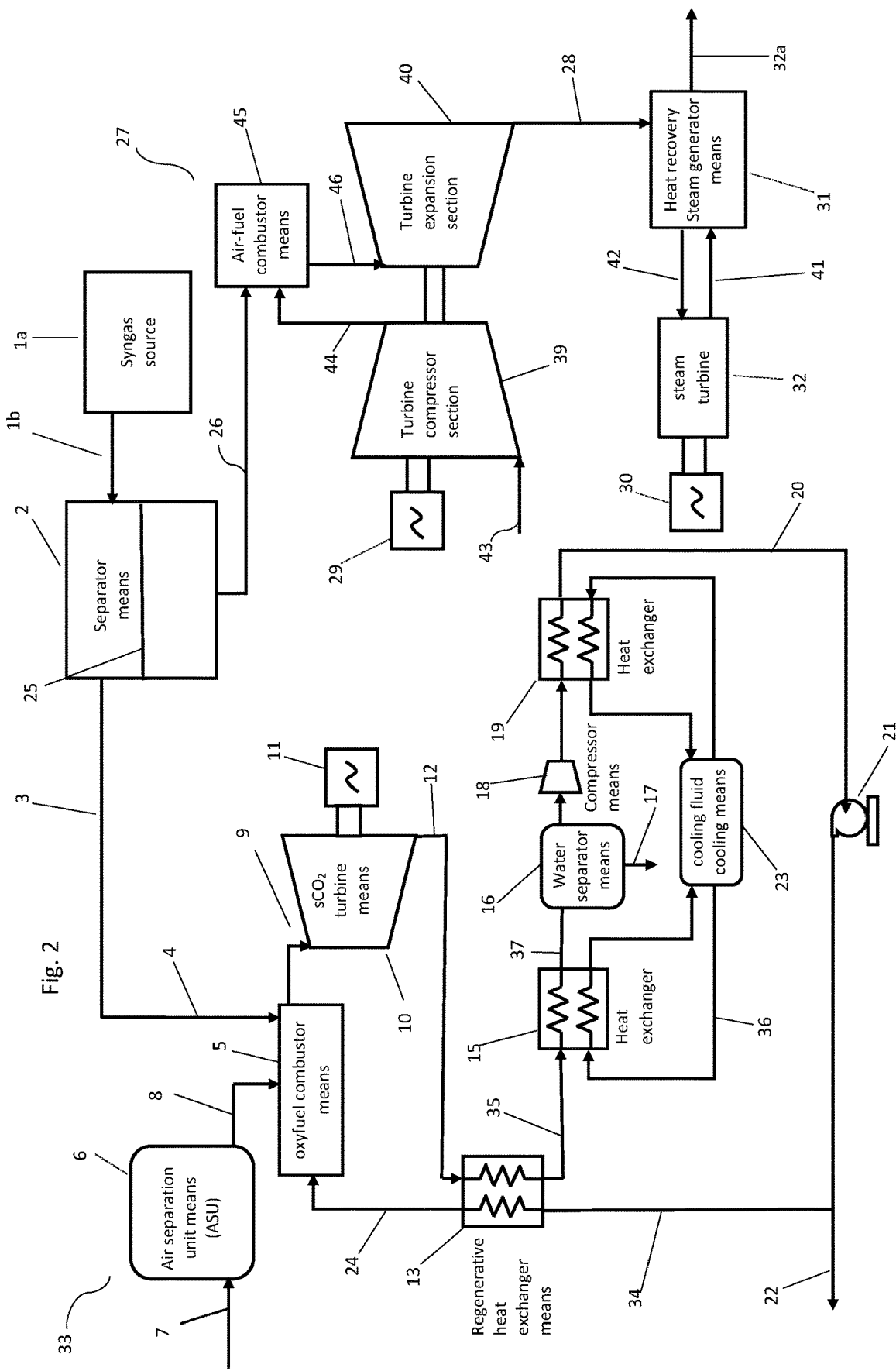
FIG. 2 is a schematic diagram of a supercritical carbon dioxide plant combined with an air-fuel turbine/steam turbine plant.

With reference to illustrative FIG. 2 of the drawings, 1*a* is a source for producing syngas feedstream 1*b* to separator means 2. The source of syngas feed can be any known source, for example, a steam reformer system or a coal gasification system. Steam reformer systems are known and are described, for example, in U.S. Pat. Nos. 3,479,298, 5,653,774 and 5,628,931. Coal gasification systems are also known and are described, for example, in U.S. Pat. No. 8,252,074B2, U.S. Pat. No. 8,758,458B2 and U.S. Pat. No. 9,388,348B2.

Syngas feed compositions are well known in the art and can vary depending on the source. By way of nonlimiting example, it is believed that syngas feed 1*b* can comprise $H_2$, $CO_2$, CO, $CH_4$ and $H_2O$ in the following amounts. The $H_2$ content can be about 20-65%. The $CO_2$ content can be about 2-25%. The CO content can be about 20-60%. The $H_2O$ content can be about 5-40%. The $CH_4$ content can typically be about 0.1%-0.9%. It is understood that the syngas feed 1*b* may contain minor amounts of contaminants, e.g., $H_2S$, $NH_3$, HCl, COS, and Hg, depending whether the syngas is gasified coal or reformed natural gas, and can be removed by known treatments. By way of example, contaminants could comprise less than about 0.5% of syngas feed 1*b*.

Separator means 2 can be any known separator means suitable for the purpose of separating the syngas feedstream into a first, CO-rich stream 3 and a second, $H_2$-rich stream 26. For example, separator means can be membrane separator means or pressure swing adsorption means. Membrane separation is preferred.

Gas separation membranes and the operation thereof for separating gas mixtures are well known. See for example, U.S. Pat. No. 5,482,539. U.S. Pat. Nos. 4,990,168, 4,639, 257, 2,966,235, 4,130,403, 4,264,338, and 5,102,432. Any known membrane that is operable under the conditions of operation to meet the noted product compositions can be used. For example, UBE membranes advertised for $H_2$ separations would be suitable, as would a polybenzimidazole (PBI) membrane. Reference is made, respectively, to Haruhiko Ohya et al, "Polyimide Membranes: Applications, Fabrications and Properties" by H. Ohya, V. V. Kudryavtsev and S. I, Semenova (Jan. 30, 1997) co-published by Kodansha LYD., 12-21 Otowa 2-Chome Bunkyo-Ku, Tokyo 112, Japan and Gordan and Breach Science Publishers S.A. Emmaplein 5, 1075 AW Amsterdam, The Netherlands, for the Ube membranes and to Jayaweera, Indira S. "Development of Pre-Combustion $CO_2$ Capture Process Using High-Temperature Polybenzimidazole (PBI) Hollow-Fiber Membranes (HFMs)", 2017 NETL $CO_2$ Capture Technology Project Review Meeting, Aug. 21-25, 2017, [online] [retrieved Jan. 17, 2019], [https://www.netl.doe.gov/sites/default/files/2017-12/2I-S-Jayaweera2-SRI-PBI-Hollow-Fiber-Membranes.pdf], and "Celazole$^R$ PBI", [online] [retrieved Jan. 17, 2019], [https://pbipolymer.com/markets/membrane/].

As illustrated in FIG. 2, separator means 2 comprises membrane means 25 disposed therewithin. The syngas feedstream is fed to separator means on one side of the membrane means and is separated into separate streams by selective permeation of syngas components therethrough. As shown, the membrane is more permeable to the $H_2$ contained in the syngas feedstream than it is to CO. The membrane being more selective for $H_2$ permeation, permeate stream 26 is enriched in $H_2$ as compared to syngas feedstream 1b, and retentate stream 3 is enriched in CO as compared to the syngas feedstream 1b. Accordingly, stream 26 comprises a $H_2$-rich stream and stream 3 comprises a CO-rich stream. The CO-rich stream is then sent to a $sCO_2$ power plant 33 as discussed above.

Concepts of mixed-gas separation, gas permeability and selectivity are discussed in a number of publications, including "Materials Science of Membranes for Gas and Vapor Separation", Edited by Yampolski et al, 2006 JohnWiley & Sons; "Pure and mixed gas $CH_4$ and n-C4H10 permeability and diffusivity in poly(1-trimethylsilyl-1-propyne)" Roy D. Raharjo et al, Polymer 48 (2007) 7329-7344, 2006 Elsevier Ltd., "Carbon Dioxide Separation through Polymeric Membrane Systems for Flue Gas Applications", Colin A. Scholes et al, Cooperative Research Centre for Greenhouse Gas Technologies, Department of Chemical and Biomolecular Engineering, The University of Melbourne, VIC, 3010, Australia; and "Recent Patents on Chemical Engineering", 2008, 1 52-66, 2008 Bentham Science Publishers Ltd.

The CO-rich stream 3 comprises primarily CO, with minor amounts of carbon dioxide and hydrogen.

After optional contaminant removal (not shown), stream 3 should comprise primarily CO and hydrogen. Stream 3 can also comprise a small amount of $CO_2$ and traces of remaining contaminants. For example, stream 3 can comprise at least about 35%, or at least about 50%, or at least about 65%, or at least about 80% CO. Having the benefit of the disclosure of the present invention, it is seen that the $H_2$ content of stream 3 depends on operational and plant design objectives. On that basis, it is believed that the stream 3 should comprise less than about 55%, or less than about 40%, or less than about 25%, or less than about 10% $H_2$. Stream 3 can also comprise a small amount of $CO_2$ and traces of remaining contaminants. Stream 3 should comprise less than about 0.01%, or less than about 0.001%, or less than about 0.0001%, or less than about 0.00001% of contaminants; and $CO_2$ should comprise less than about 25%, or less than about 15%, or less than about 10%, or less than about 5% of stream 3. Any upper limit for the CO content of stream 3 is considered to be limited only by the ability of technology to economically enrich stream 3 in CO. It is believed that using present technology, stream 3 can comprise up to about 90-95% CO.

Stream 3 is then fed as oxyfuel combustor feedstream 4 to oxyfuel combustor means 5, wherein it is combined and reacted with high purity oxygen stream 8 of at least about 95% purity from air separation unit means 6 for separating oxygen from air. The oxygen content of stream 8 comprises at least about 95%, at least about 97%, at least about 99%, or at least about 99.5%. Air separation units are well known, for example, as illustrated in U.S. Pat. Nos. 2,548,377, 4,531,371 and 4,382,366. See also, Rong Jiang, Analysis and Optimization of ASU for Oxyfuel Combustion [online] [retrieved 2-19-2019][http://ieaghg.org/docs/General_Docs/5oxy%20presentations/Session%207B/7B-05%20-%20R.%20Jiang%20(SASPG%20Ltd.).pdf]. and "History and progress in the course of time, [online] [retrieved Feb. 19, 2019] [https://www.linde-engineering.com/en/images/Air_separation_plants_History_and_progress_in_the_course_of_time_tcm19-457349.pdf]. Before the use of a separator means to separate hydrogen from the syngas feedstream 1b in accordance with the present invention, a considerable portion of the oxygen produced in prior air separation units was consumed by reaction with $H_2$ contained in the combustor fuel stream 4. Combustion in accordance with an embodiment of the present invention, results in stream 9 comprised primarily of $sCO_2$ working fluid with a substantially reduced amount of steam. The $sCO_2$ content of the oxyfuel combustion exhaust in stream 9 will, of course, vary, depending on the amount of $H_2$ recovery in the membrane permeate and the amount of $CO_2$ in the membrane feedstream both of which affects the $CO_2$ content in the $sCO_2$ oxyfuel combustion exhaust. In any event, it can comprise at least about 50%, at least about 60% at least about 70%, or at least about 80% $sCO_2$, with the balance comprising $H_2O$, and contaminants such as $N_2+Ar$. An unexpected advantage of using a CO-rich fuel stream in accordance with the present invention to the oxyfuel combustor means 5 is that the oxyfuel combustor oxygen requirement can be significantly reduced, by way of non-limiting example, by up to about 50 to 75%, depending on the source of the feed to separator means 2 (e.g., gasified coal or steam reformed methane, respectively) and the operating conditions and type of separator means 2 used. In addition, the oxyfuel combustor and $sCO_2$ turbine sizes can be significantly reduced due to the substantial reduction of the hydrogen fraction and hydrogen mass flow in stream 4 and consequently, after combustion with high purity oxygen in oxyfuel combustor means 5, a substantial reduction in steam fraction in stream 12.

Supercritical $CO_2$ ($sCO_2$) 9 is then fed to the inlet of a $sCO_2$ turbine means 10 wherein power is produced to power electricity generator 11.

Turbine exhaust 12 is then fed to regenerative heat exchanger means 13 for indirect cooling with cooled $sCO_2$ stream 34. The thus-cooled $sCO_2$ stream 35 is fed for further cooling in cooling means 15 for indirect cooling with cooling fluid 36. Cooled $sCO_2$ stream 37 is sent to condensed water separator means 16 for removing condensed water 17 from cooled $sCO_2$ stream 37. Since stream 37 comprises less water due to the separation of hydrogen from stream 1b by separator means 2, cooling means 23 energy and equipment size requirements can be significantly reduced. Cooling fluid 36 for heat exchangers 15 and 19 is provided by cooling fluid cooling means 23. The $sCO_2$ working fluid leaving the water separator 16, is compressed in $CO_2$ compressor means 18, and then cooled in aftercooler means 19 to remove heat of compression. Compressed and cooled $sCO_2$ is circulated by pump 21 for capture in stream 22 and recirculation in stream 34 and then forwarded through regenerative heat exchanger 13 and finally back to oxyfuel combustor means 5. Recycle stream 24 is a working fluid for the optimum performance of the $sCO_2$ oxyfuel combustor and $sCO_2$ turbine. Recycling the supercritical $CO_2$ after reheating in regenerative heat exchanger 13 to oxyfuel combustor means 5 enables the supercritical carbon dioxide power cycle to operate with super critical $CO_2$ as the working fluid in turbine 10. The cycle is operated above the critical point of $CO_2$ so that it does not change phases (from liquid to gas), but rather undergoes density changes over small ranges of temperature and pressure. This allows a large amount of energy to be extracted at high temperature from equipment that is relatively small. For example, $sCO_2$ turbines can have a nominal gas path diameter an order of magnitude smaller than utility scale gas turbines or steam turbines.

Permeate, $H_2$-rich gas stream 26 is fed to a combined cycle system 27. Gas stream 26 comprises primarily $H_2$ and $H_2O$ with small quantities of $CO_2$ and CO. Stream 26 can comprise at least about 40%, or at least about 50%, or at least about 60% or at least about 85% $H_2$. Having the benefit of the disclosure of the present invention, it is seen that the CO content of stream 26 depends on operational and plant design objectives. On that basis, it is believed that stream 26 should comprise less than about 10% CO, or less than about 5% CO, or less than about 3% CO, or less than about 1% CO with the balance comprising other components such as $CO_2$ and $H_2O$. Any upper limit for the $H_2$ content of stream 26 is considered to be limited only by the ability of technology to economically enrich stream 26 in $H_2$. It is believed that using present technology, stream 26 can comprise up to about 90-95% $H_2$.

Gas stream 26 is fed as an air-fuel combustor feedstream to air-fuel combustor means 45 of a known air-fuel gas turbine means comprising known turbine compressor section 39 and expansion section 40. As shown, working fluid air stream 43 is fed to compressor section 39. Compressed air stream 44 is fed to combustor means 45 wherein the compressed air and fuel gas stream 26 are mixed and combusted to form gas turbine working fluid 46. Working fluid 46 is then fed to expansion section 40 of the air-fuel gas turbine means wherein the working fluid expands, producing power which, in turn, drives electricity generator 29 and compressor section 39. Expanded exhaust 28 is then fed to known heat recovery steam generator means (HRSG) 31, wherein exhaust 28 indirectly heats a water stream to produce steam stream 42. The steam becomes the working fluid 42 which is fed to a known steam turbine system 32 that powers electricity generator 30. Condensed steam stream 41 is recycled back to the HRSG 31.

While known gas turbines typically burn carbonaceous fuels (e.g., natural gas or syngas) mixed with air to form a working fluid, processes in accordance with the present invention burn primarily $H_2$ with substantially reduced percentages of $CO_2$ and CO, and thus little or virtually no carbon dioxide is exhausted to the ambient environment in stream 32a. Reduction or elimination of the carbonaceous part of the separator means syngas feed stream enables a significant downsizing of the combined cycle power generation equipment by not having to burn the fraction of carbon contained in natural gas and syngas.

EXAMPLES

Example 1

Table 1 gives nonlimiting illustrative summary cases of potential approximate plant size reductions and therefore capital cost reductions due to the benefits of the invention when the separator means is a membrane. The summary cases correspond to two types of membrane separator means (membranes described in Examples 2 and 3 below), four separator means operating temperatures and two syngas sources. Table 2 is a representative material balance diagram explaining how savings were calculated.

TABLE 1

Respective plant size reductions according to membrane type, syngas source and operating temperature.

| Mbr.* Type | Syngas Source | Temp. ° C. | Selectivity $H_2/CO$ | Selectivity $H_2/CO_2$ | Plant Red.[1] $sCO_2$ cooler Condenser | Plant Red.[2] $sCO_2$ turbine and ASU | Plant Red.[3] Combined Cycle | $CO_2$ Capture | System $H_2$ Recovery |
|---|---|---|---|---|---|---|---|---|---|
| PI | nat. gas | 60.3 | 100.0 | 8.0 | 95.77% | 72.36% | 27.64% | 91.3% | 100.0% |
| PI | nat. gas | 97.4 | 76.0 | 8.8 | 44.08% | 32.97% | 67.03% | 98.4% | 100.0% |
| PI | nat. gas | 127.0 | 65.0 | 9.3 | 43.80% | 32.79% | 67.21% | 98.3% | 100.0% |
| PI | coal | 60.3 | 100.0 | 8.0 | 63.73% | 31.63% | 68.37% | 95.0% | 100.0% |
| PI | coal | 97.4 | 76.0 | 8.8 | 64.02% | 31.99% | 68.01% | 95.0% | 100.0% |
| PI | coal | 127.0 | 65.0 | 9.3 | 63.57% | 31.91% | 68.09% | 95.0% | 100.0% |
| PBI | nat. gas | 225.0 | 103.2 | 40.0 | 96.04% | 72.44% | 27.56% | 95.0% | 100.0% |
| PBI | coal | 225.0 | 103.2 | 40.0 | 95.42% | 48.16% | 51.84% | 95.0% | 100.0% |

*PI = polyimide membrane and PBI = polybenzimidazole membrane

[1]Plant size reductions for the $sCO_2$ plant cooler, condenser and heat exchangers.

[2]Plant size reductions for the air separation unit, $sCO_2$ combustor and $sCO_2$ turbine.

[3]Plant size reduction for the air-fuel turbine, HRSG and steam turbine.

Table 2

|   | A | B | C | D | E | F | G | H | I |
|---|---|---|---|---|---|---|---|---|---|
| 1 |   |   |   |   |   |   | First CO-rich stream 3: | | |
| 2 | Membrane separator means: UBE polyimide | | | | | | | | combust[3] |
| 3 | Separator feedstream 1b: reformed natural gas | | | | | | | to sCO$_2$ | to sCO$_2$ |
| 4 | Temperature: | | 60.33° C. | | | | | scf | scf |
| 5 | Super critical CO$_2$ H$_2$ recovery: | | | | 4.23% | | CO$_2$ | 1.53 | 0.00 |
| 6 | Combined cycle H$_2$ recovery: | | | | 95.77% | | CO | 20.80 | 20.80 |
| 7 | Total system H$_2$ recovery: | | | | 100.00% | | CH$_4$ | 0.86 | 0.86 |
| 8 | Super critical CO$_2$ capture: | | | | 91.32% | | Ar + N$_2$ | 0.17 | 0.00 |
| 9 |   |   |   |   |   |   | H$_2$ | 2.78 | 2.78 |
| 10 | Membrane feedstream 1b: | | | | | | H$_2$O | 0.37 | 0.00 |
| 11 |   | scf | combust[1] | cool[2] | | | | 26.52 | 24.44 |
| 12 | CO$_2$ | 2.63 | 0.00 | 0.00 | | | | | |
| 13 | CO | 21.89 | 21.89 | 0.00 | | | Second H$_2$-rich stream 26: | | |
| 14 | CH$_4$ | 0.88 | 0.88 | 0.00 | | | | combust[4] | cool[5] |
| 15 | Ar + N$_2$ | 0.18 | 0.00 | 0.00 | | | to CC | to CC | to CC |
| 16 | H$_2$ | 65.66 | 65.66 | 65.66 | | | scf | scf | scf |
| 17 | H$_2$O | 8.76 | 0.00 | 8.76 | | CO$_2$ | 1.10 | 0.00 | 0.00 |
| 18 |   | 100.00 | 88.43 | 74.42 | | CO | 1.09 | 1.09 | 0.00 |
| 19 |   |   |   |   |   | CH$_4$ | 0.02 | 0.02 | 0.00 |
| 20 |   |   |   |   |   | Ar + N$_2$ | 0.01 | 0.00 | 0.00 |
| 21 |   |   |   |   |   | H$_2$ | 62.88 | 62.88 | 62.88 |
| 22 |   |   |   |   |   | H$_2$O | 8.39 | 0.00 | 839 |
| 23 |   |   |   |   |   |   | 73.48 | 63.99 | 71.27 |

[1] Combustible components in membrane feedstream 1b in FIG. 2 Hydrogen and water components in membrane feedstream 1b in FIG. 2 Combustible components in first CO-rich stream 3 in FIG. 2 to super critical CO2 stream 4 in FIG. 2 Combustible components in second H$_2$-rich stream 26 in FIG. 2 to combined cycle (CC)
[5] Hydrogen and water components in second H$_2$-rich stream 26 in FIG. 2 to combined cycle (CC)

Plant Size Reductions

ASU & sCO$_2$ power cycle plant size reduction=H23/C18=72.36%

Combined cycle (CC) plant size reduction=I11/C18=27.64%

Cooling/condenser/heat exchanger plant size reduction=I23/D18=95.77%

Example 2

Table 3

UBE Industries, Ltd., Polyimide Membrane H$_2$ and CO Permeability and Selectivity vs. Temperature Data

| ° F. | 1000T$^{-1}$(K)$^{-1}$ x | ° C. | selectivity H$_2$/CO | GPU[1] H$_2$ | GPU[1] CO | GPU[2] H$_2$ × 10$^{-6}$ | GPU[2] CO × 10$^{-6}$ | Barrer[3] H$_2$ (×10$^{-10}$) | Barrer[3] CO (×10$^{-10}$) |
|---|---|---|---|---|---|---|---|---|---|
| 77.91 | 3.35 | 25.51 | 134.78 | 0.31 | 0.002 | 4.135 | 0.031 | 4.135 | 0.0307 |
| 140.60 | 3.00 | 60.33 | 100.00 | 0.80 | 0.008 | 10.671 | 0.107 | 10.671 | 0.1067 |
| 207.27 | 2.70 | 97.37 | 75.95 | 1.80 | 0.024 | 24.010 | 0.316 | 24.010 | 0.3161 |
| 260.60 | 2.50 | 127.00 | 65.00 | 2.60 | 0.040 | 34.681 | 0.534 | 34.681 | 0.5336 |
| 212.00 | 2.68 | 100.00 | 74.88 | UBE membrane maximum operating temperature is 100° C. | | | | | |

[1] P/I (mm$^3$/s/m$^2$/Pa) Selectivity for 100° C. calculated by equation
[2] P/I (cm$^3$/s/cm$^2$/cm Hg) y = 0.0046x$^2$ − 1.3818x + 166.98
[3] P (cm$^3$-cm)/s/cm$^2$/cm Hg) when I = 0.0001 cm membrane thickness Source: Polyimide Membranes - Applications, Fabrication, and Properties by Haruhiko Ohya, Vladislav V. Kudryavtsev and Svetlana I. Semenova (Jan. 30, 1997) page 250 Gordan and Breach Science Publishers S.A., Emmaplein 5, 107SAW Amsterdam, The Netherlands Pg. 250, FIG. 6.7, Temperature of pure gas permeation rates through asymmetric polyimide hollow fiber membrane . . . by UBE Industries, Ltd. (From Haraya, K. et al., Gas Separation and Purification, 1, 4 (1987))

UBE Industries, Ltd., Polyimide Membrane $H_2$ and CO Permeability and Selectivity vs. Temperature Data

TABLE 4

UBE Industries, Ltd., Polyimide Membrane $H_2$ and $CO_2$ Permeability and Selectivity vs. Temperature Data

| °F. | $1000T^{-1}(K)^{-1}$ x | °C. | selectivity $H_2/CO_2$ | GPU[1] $H_2$ | GPU[1] $CO_2$ | GPU[2] $H_2 \times 10^{-6}$ | GPU[2] $CO \times 10^{-6}$ | Barrer[3] $H_2 (\times 10^{-10})$ | Barrer[3] $CO (\times 10^{-10})$ |
|---|---|---|---|---|---|---|---|---|---|
| 77.91 | 3.35 | 25.51 | 6.89 | 0.31 | 0.045 | 4.135 | 0.600 | 4.135 | 0.6003 |
| 140.60 | 3.00 | 60.33 | 8.00 | 0.80 | 0.100 | 10.671 | 1.334 | 10.671 | 1.3339 |
| 207.27 | 2.70 | 97.37 | 8.82 | 1.80 | 0.204 | 24.010 | 2.721 | 24.010 | 2.7212 |
| 260.60 | 2.50 | 127.00 | 9.29 | 2.60 | 0.280 | 34.681 | 3.735 | 34.681 | 3.7349 |
| 212.00 | 2.68 | 100.00 | 9.97 | UBE membrane maximum operating temperature is 100° C. | | | | | |

[1]P/I (mm³/s/m²/Pa) Selectivity for 100° C. calculated by equation
[2]P/I (cm³/s/cm²/cm Hg)
[3]P (cm³-cm)/s/cm²/cm Hg) when I = 0.0001 cm membranw thickness
Source: Polyimide Membranes - Applications, Fabrication, and Properties by Haruhiko Ohya, Vladislav V. Kudryavtsev and Svetlana I. Semenova (Jan. 30, 1997) page 250 Gordan and Breach Science Publishers S.A., Emmaplein 5, 107SAW Amsterdam, The Netherlands, Pg. 250, FIG. 6.7, Temperature of pure gas permeation rates through asymmetric polyimide hollow fiber membrane . . . by UBE Industries, Ltd. (From Haraya, K. et al., Gas Separation and Purification, 1, 4 (1987))

In Tables 3 and 4, UBE Industries, Ltd. (UBE) is a Japanese multinational manufacturer of polyimide hydrogen separation membranes and have supplied membranes globally to industry for many years.

$H_2$ and CO permeability values versus temperature are presented in Table 3 and $H_2$ and $CO_2$ permeability values are presented in Table 4. The GPU unit, also known as permeance, is a pressure normalized steady state flux for a given membrane thickness and is given as volumetric flow per unit area per second per unit differential pressure across the membrane. The Barrer unit, also known as permeability, is a steady state flux normalized for both membrane thickness and pressure differential across the membrane and is given as volumetric flow times membrane thickness, per unit area per second per unit differential pressure across the membrane. Selectivity is the ratio of the respective GPU or Barrer units, e.g., $H_2/CO$ selectivity at 97.37° C. of 75.95 is determined by following ratio:

24.1010 cm³/cm²/s/cm Hg divided by 0.316³/cm²/s/cm Hg=75.95

It can be seen from the Tables 3 and 4 that $H_2/CO$ selectivity is more sensitive to temperature change than $H_2/CO_2$ selectivity. The maximum operating temperature for the UBE polyimide membrane is 150° C. Operating an UBE polyimide membrane separator means at the maximum temperature of 150° C. increases overall system thermal efficiency. Further, the trendline equation in Table 3 calculates a $H_2/CO$ selectivity of 63.33 at 150° C., a selectivity reduction of only 2.60% compared with 127° C. Furthermore, based a trendline algorithm for temperature vs. $H_2$ GPU values in Table 3, $H_2$ GPU is increased by about 30% at 150° C. compared with 127° C.

Example 3

TABLE 5

SRI International, Polybenzimidazole (PBI) Membrane $H_2$, CO and $CO_2$ Permeability and Selectivity vs. Temperature Data

| °F. | °C. | selectivity $H_2/CO$ | GPU[1] $H_2 \times 10^{-6}$ | GPU[1] $CO \times 10^{-6}$ | Barrer[2] $H_2 (\times 10^{-10})$ | Barrer[2] $CO (\times 10^{-10})$ |
|---|---|---|---|---|---|---|
| 437.00 | 225.00 | 103.0 | 80.0 | 0.775 | 80.0 | 0.775 |

[1]P/I (cm3/s/cm2/cm Hg)
[2]P (cm³ - cm)/s/cm²/cm Hg) when I = 0.0001 cm membrane thickness

| °F. | °C. | selectivity $H_2/CO$ | GPU[1] $H_2 \times 10^{-6}$ | GPU[1] $CO_2 \times 10^{-6}$ | Barrer[2] $H_2 (\times 10^{-10})$ | Barrer[2] $CO_2 (\times 10^{-10})$ |
|---|---|---|---|---|---|---|
| 437.00 | 225.00 | 40.0 | 80.0 | 2.00 | 80.0 | 2.00 |

[1]P/I (cm3/s/cm2/cm Hg)
[2]P (cm³ × cm)/s/cm²/cm Hg) when I = 0.0001 cm membrane thickness

PBI DATA:

The PBI data in Table 4 is available at: https://www.netl.doe.gov/sites/default/files/2017-12/2I-S-Jayaweera2-SRI-PBI-Hollow-Fiber-Membranes.pdf Example 4

TABLE 6

Non-limiting examples of a range of concentrations of the first separated CO-rich stream and the second separated $H_2$-rich stream

| | $CO_2$ conc. | CO conc. | $CH_4$ conc. | $Ar/N_2$ conc. | $H_2$ conc. | $H_2S$ conc. | $H_2O$ conc. |
|---|---|---|---|---|---|---|---|
| PI membrane | | | | | | | |
| Reformed natural gas syngas Feed | 2.6% | 21.9% | 0.9% | 0.2% | 65.7% | 0.0% | 8.8% |
| First CO-rich stream at 60.33° C. | 5.8% | 78.4% | 3.2% | 0.7% | 10.5% | 0.0% | 1.4% |
| First CO-rich stream at 97.37° C. | 5.9% | 69.9% | 2.9% | 0.6% | 18.3% | 0.0% | 2.4% |
| First CO-rich stream at 127.00° C. | 5.9% | 64.9% | 2.7% | 0.5% | 23.0% | 0.0% | 3.1% |
| Second $H_2$-rich stream at 60.33° C. | 1.5% | 1.5% | 0.0% | 0.0% | 85.6% | 0.0% | 11.4% |

TABLE 6-continued

Non-limiting examples of a range of concentrations of the first separated CO-rich stream and the second separated H$_2$-rich stream

|  | CO$_2$ conc. | CO conc. | CH$_4$ conc. | Ar/N$_2$ conc. | H$_2$ conc. | H$_2$S conc. | H$_2$O conc. |
|---|---|---|---|---|---|---|---|
| Second H$_2$-rich stream at 97.37° C. | 1.2% | 1.6% | 0.0% | 0.0% | 85.8% | 0.0% | 11.4% |
| Second H$_2$-rich stream at 127.00° C. PI membrane | 1.1% | 1.6% | 0.0% | 0.0% | 85.8% | 0.0% | 11.4% |
| Gasified coal syngasFeed | 10.9% | 28.5% | 0.1% | 1.2% | 27.0% | 0.6% | 31.7% |
| First CO-rich stream at 60.33° C. | 15.3% | 46.4% | 0.2% | 2.0% | 16.2% | 1.0% | 19.0% |
| First CO-rich stream at 97.37° C. | 15.6% | 46.3% | 0.2% | 2.0% | 16.1% | 1.0% | 18.9% |
| First CO-rich stream at 127.00° C. | 15.6% | 46.0% | 0.2% | 2.0% | 16.2% | 1.0% | 19.0% |
| Second H$_2$-rich stream at 60.33° C. | 4.1% | 1.0% | 0.0% | 0.0% | 43.7% | 0.0% | 51.3% |
| Second H$_2$-rich stream at 97.37° C. | 3.8% | 1.3% | 0.0% | 0.0% | 43.7% | 0.0% | 51.3% |
| Second H$_2$-rich stream at 127.00° C. PBI membrane | 3.6% | 1.5% | 0.0% | 0.0% | 43.7% | 0.0% | 51.3% |
| Reformed natural gas syngas Feed | 2.6% | 21.9% | 0.9% | 0.2% | 65.7% | 0.0% | 8.8% |
| First CO-rich stream at 225° C. | 8.6% | 76.8% | 3.2% | 0.6% | 9.5% | 0.0% | 1.3% |
| Second H$_2$-rich stream at 225° C. PBI membrane | 0.4% | 1.3% | 0.0% | 0.0% | 86.7% | 0.0% | 11.6% |
| Gasified coal syngasFeed | 10.9% | 28.5% | 0.1% | 1.2% | 27.0% | 0.6% | 31.7% |
| First CO-rich stream at 225° C. | 23.7% | 65.5% | 0.2% | 2.8% | 2.9% | 1.4% | 3.5% |
| Second H$_2$-rich stream at 225° C. | 1.6% | 1.7% | 0.0% | 0.0% | 44.4% | 0.0% | 52.1% |

Table 6 is a non-limiting illustration of membrane separator means performance which depends upon given operating conditions of syngas source, feed composition, membrane type and operating temperature. Accordingly, for the different operating conditions, CO concentration in the first CO-rich stream ranges from 46.0% to 78.4% and H$_2$ concentration in the second H$_2$-rich stream ranges from 43.7% to 86.7%%.

The invention claimed is:

1. A process comprising:
 a. feeding a separator feedstream comprising syngas from a steam methane reformer to membrane separator means,
 b. separating the separator feedstream to form a first, CO-rich retentate stream, and a second, H$_2$-rich permeate stream,
 c. feeding the retentate stream as an oxyfuel combustor feedstream to oxyfuel combustor means wherein the oxyfuel combustor feedstream is reacted with a high purity oxygen stream to form a supercritical CO$_2$ working fluid,
 d. feeding the supercritical CO$_2$ working fluid to supercritical CO$_2$ turbine means for producing power, wherein the supercritical CO$_2$ turbine means provides power to electricity generator means for generating electric power,
 e. feeding the permeate stream as an air-fuel combustor feedstream to air-fuel combustor means wherein the air-fuel combustor feedstream is reacted with air to form air-fuel gas turbine working fluid,
 f. feeding the air-fuel gas turbine working fluid to an air-fuel gas turbine means for producing power, wherein the air-fuel gas turbine means provides power to electricity generator means for generating electric power,
 g. feeding air-fuel gas turbine exhaust from the air-fuel gas turbine means to heat recovery means wherein steam is formed, and
 h. feeding the steam formed in step g. as working fluid to steam turbine means for producing power, wherein the steam turbine means provides power to electricity generator means for generating electric power.

2. The process of claim 1, wherein the oxyfuel combustor means reacts high purity oxygen of at least 97% purity with the oxyfuel combustor feedstream to produce supercritical CO$_2$.

3. The process of claim 1, wherein exhaust from the supercritical CO$_2$ turbine comprises sCO$_2$ and steam and is fed to water separation means for separating water from the exhaust, wherein the water separation means comprises the step of the exchange of heat from the exhaust to cooling fluid.

4. The process of claim 1, wherein the high purity oxygen stream is at least 95% pure.

5. The process of claim 4, wherein the CO-rich stream comprises at least 40% CO and the H$_2$-rich stream comprises at least 40% H$_2$.

6. The process of claim 5, wherein the CO-rich stream comprises at least 50% CO and the H$_2$-rich stream comprises at least 50% H$_2$.

7. The process of claim 6, wherein the CO-rich stream comprises at least 65% CO and the H$_2$-rich stream comprises at least 60% H$_2$.

8. The process of claim 7, wherein the CO-rich stream comprises at least 80% CO and the H$_2$-rich stream comprises at least 85% H$_2$.

9. The process of claim 5, wherein the oxyfuel combustor means reacts high purity oxygen of at least 97% purity with the oxyfuel combustor feed steam to produce supercritical CO$_2$.

10. The process of claim 1, wherein the oxyfuel combustor means reacts high purity oxygen of at least 99% purity with the oxyfuel combustor feed steam to produce supercritical CO$_2$.

11. The process of claim 10, wherein the oxyfuel combustor means reacts high purity oxygen of at least 99.5% purity with the oxyfuel combustor feed steam to produce supercritical CO$_2$.

12. A process comprising:
 a. feeding a separator feedstream comprising syngas from a steam methane reformer to a membrane separator, b. separating the separator feedstream to form a first, CO-rich retentate stream, and a second, $H_2$-rich permeate stream,
c. feeding the retentate stream as an oxyfuel combustor feedstream to an oxyfuel combustor wherein the oxyfuel combustor feedstream is reacted with a high purity oxygen stream to form a supercritical $CO_2$ working fluid,
d. feeding the supercritical $CO_2$ working fluid to a supercritical $CO_2$ turbine for producing power, wherein the supercritical $CO_2$ turbine provides power to an electricity generator for generating electric power,
e. feeding the permeate stream as an air-fuel combustor feedstream to an air-fuel combustor wherein the air-fuel combustor feedstream is reacted with air to form air-fuel gas turbine working fluid,
f. feeding the air-fuel gas turbine working fluid to an air-fuel gas turbine for producing power, wherein the air-fuel gas turbine provides power to an electricity generator for generating electric power,
g. feeding air-fuel gas turbine exhaust from the air-fuel gas turbine to a heat recovery steam generator wherein steam is formed, and
h. feeding the steam formed in step g. as working fluid to a steam turbine for producing power, wherein the steam turbine provides power to an electricity generator for generating electric power.

* * * * *